United States Patent [19]
Yokomura

[11] Patent Number: 6,026,280
[45] Date of Patent: Feb. 15, 2000

[54] ANTENNA MATCHING CIRCUIT SWITCHING SYSTEM IN TDMA PORTABLE TELEPHONE

[75] Inventor: Ryouji Yokomura, Saitama, Japan

[73] Assignee: NEC Corporation, Tokyo, Japan

[21] Appl. No.: 08/873,622

[22] Filed: Jun. 12, 1997

[30] Foreign Application Priority Data

Jun. 12, 1996 [JP] Japan .................................... 8-150854

[51] Int. Cl.$^7$ .................................................. H04B 1/44
[52] U.S. Cl. .............................. 455/78; 455/83; 455/121; 455/193.1
[58] Field of Search .................................. 455/78, 82, 83, 455/280, 281, 282, 289, 290, 434, 455, 84, 120, 121, 193.1; 333/32, 101, 103

[56] References Cited

U.S. PATENT DOCUMENTS

| 4,637,073 | 1/1987 | Selin et al. .................................... 455/78 |
| 5,193,218 | 3/1993 | Shimo ........................................... 455/83 |
| 5,442,812 | 8/1995 | Ishizaki et al. .............................. 455/82 |
| 5,477,532 | 12/1995 | Hoshigami et al. ........................ 455/83 |
| 5,515,364 | 5/1996 | Fague ........................................... 455/83 |
| 5,521,561 | 5/1996 | Yrjola et al. ............................... 333/103 |
| 5,544,224 | 8/1996 | Jonsson et al. ............................. 455/455 |
| 5,754,141 | 5/1998 | Thompson et al. ....................... 455/289 |
| 5,768,690 | 6/1998 | Yamada et al. ............................. 455/78 |
| 5,784,687 | 7/1998 | Itoh et al. .................................... 455/83 |
| 5,789,995 | 8/1998 | Minasi ........................................ 455/83 |

FOREIGN PATENT DOCUMENTS

| 59-147347 | 10/1984 | Japan . |
| 3-119836 | 5/1991 | Japan . |
| 5-22002 | 8/1992 | Japan . |
| 5-55944 | 3/1993 | Japan . |
| 6-244756 | 9/1994 | Japan . |
| 6-252791 | 9/1994 | Japan . |

*Primary Examiner*—Dwayne D. Bost
*Assistant Examiner*—Quochien B. Vuong
*Attorney, Agent, or Firm*—Scully, Scott, Murphy & Presser

[57] ABSTRACT

In an antenna matching circuit switching system of a portable telephone, an antenna transmits a transmission signal and receives a reception signal in form of electromagnetic wave. A receiving section receives the reception signal from the antenna and a transmission section supplies the antenna with the transmission signal having a first frequency which is different from a second frequency of the reception signal. A transmission and reception switching section connects the antenna to the receiving section in response to a reception control signal and to the transmission section in response to a transmission control signal. A first antenna matching circuit is matched to the antenna in the second frequency, and a second antenna matching circuit is matched to the antenna in the first frequency. An antenna matching circuit switching section connects the antenna to the first antenna matching circuit in response to the reception control signal and to the second antenna matching circuit in response to the transmission control signal. A control section selectively issues the reception control signal and the transmission control signal to the transmission and reception switching section and the antenna matching circuit switching section.

11 Claims, 2 Drawing Sheets

ANTENNA MATCHING CIRCUIT SWITCHING SYSTEM IN TDMA PORTABLE TELEPHONE

BACKGROUND OF THE INVENTION

1. Field of the Invention

The present invention relates to an antenna matching switching system of a portable telephone for a TDMA system which is suitable for a mobile communication system.

2. Description of Related Art

In a conventional portable telephone for a TDMA system, electromagnetic wave is transmitted and received by one antenna such as a dipole antenna to realize a small size of apparatus. In the TDMA mobile communication system of this type, generally, because a frequency of a transmission signal (a transmission frequency) and a frequency of a reception signal (a reception frequency) are different from each other. Therefore, it is difficult to establish good antenna matching in both of the transmission frequency and the reception frequency using the same antenna matching circuit in case of the above antenna. A first conventional technique is disclosed in Japanese Laid Open Utility Model Application Disclosure (JP-U-Showa 59-147347) in which a low pass filter for preventing a high frequency transmission signal from being supplied to a reception side is provided between an antenna and the reception side.

In the TDMA communication system, the transmission period of the transmission signal in case of transmission and the reception period of the reception signal in case of the reception are different from each other. Therefore, a method of establishing the antenna matching by switching the matching state of the single antenna matching circuit between the transmission and the reception is disclosed in Japanese Laid Open Patent Disclosure (JP-A-Heisei 3-119836). In the disclosed second conventional example, the standing-wave ratio of an antenna is separately measured in the transmission and in the reception. Then, the optimization of the antenna matching in case of the transmission and the reception is attempted by feeding back this measuring results into the antenna matching circuit to adjust an antenna matching state. Note that the antenna matching is to optimize the electromagnetic wave radiation efficiency from the antenna in a predetermined frequency, i.e., to establish a maximum antenna gain in the predetermined frequency. A main factor is to achieve the impedance matching of the antenna.

In the above-mentioned conventional antenna matching technique, in order to transmit and receive the electromagnetic waves whose transmission frequency and reception frequency are different from each other, by the single antenna which is optimally matched, because many circuits are required such as an antenna characteristic measurement circuit, a control circuit of this measurement circuit, an antenna matching circuit in which parameters can be changed, and a parameter control circuit for the matching circuit. Therefore, the circuit structure becomes complicated and large size. In this manner, there is a problem that it is difficult to employ the circuit structure for the antenna matching circuit of a portable telephone in which it is strongly required to achieve a small size of apparatus.

SUMMARY OF THE INVENTION

In accordance with, an object of the present invention is to provide an antenna matching circuit switching system in which the problem can be solved of the antenna matching circuit in the above-mentioned conventional technique.

Another object of the present invention is to provide an antenna matching method and an antenna matching circuit switching system of a TDMA portable telephone which can be simplified and manufactured in a small size for a mobile communication system.

Still another object of the present invention is to provide an antenna matching method and an antenna matching method and an antenna matching circuit switching system of a TDMA portable telephone in which a transmission frequency and a reception frequency of electromagnetic wave can be transmitted and received by an antenna in optimal matching states, respectively.

In order to achieve an aspect of the present invention, an antenna matching circuit switching system of a portable telephone, includes an antenna which transmits a transmission signal and receives a reception signal in form of electromagnetic wave, a receiving section for receiving the reception signal from the antenna, a transmission section for supplying the antenna with the transmission signal having a first frequency which is different from a second frequency of the reception signal, a transmission and reception switching section for connecting the antenna to the receiving section in response to a reception control signal and to the transmission section in response to a transmission control signal, a first antenna matching circuit which is matched to the antenna in the second frequency, a second antenna matching circuit which is matched to the antenna in the first frequency, an antenna matching circuit switching section for connecting the antenna to the first antenna matching circuit in response to the reception control signal and to the second antenna matching circuit in response to the transmission control signal, and a control section for selectively issuing the reception control signal and the transmission control signal to the transmission and reception switching section and the antenna matching circuit switching section.

When the portable telephone is for a TDMA system, the control section issues the reception control signal during a reception period of one TDMA period and the transmission control signal during a transmission period thereof. Also, when a power of the portable telephone is turned on, the control section issues the reception control signal In an antenna matching circuit switching system, the first antenna matching circuit may be composed of a first coil and a first capacitor, and the second antenna matching circuit may be composed of a second coil and a second capacitor.

Alternatively, when the antenna is composed of an antenna element and a coil, the first antenna matching circuit may be composed of a first capacitor, and the second antenna matching circuit may be composed of a second capacitor.

In order to achieve another aspect of the present invention, a method of establishing antenna matching in a reception mode and a transmission mode in a portable telephone, includes the steps of:

establishing a first matching quantity to an antenna in response to a reception control signal;

connecting the antenna to a receiving section in response to the reception control signal;

established a second matching quantity to the antenna in response to a transmission control signal;

connecting the antenna to a transmission section in response to the transmission control signal;

selectively issuing the reception control signal and the transmission control signal.

DESCRIPTION OF THE PREFERRED EMBODIMENT

Next, an antenna matching circuit switching system of the present invention will be described below in detail with reference to the accompanying drawings.

Figure 1:
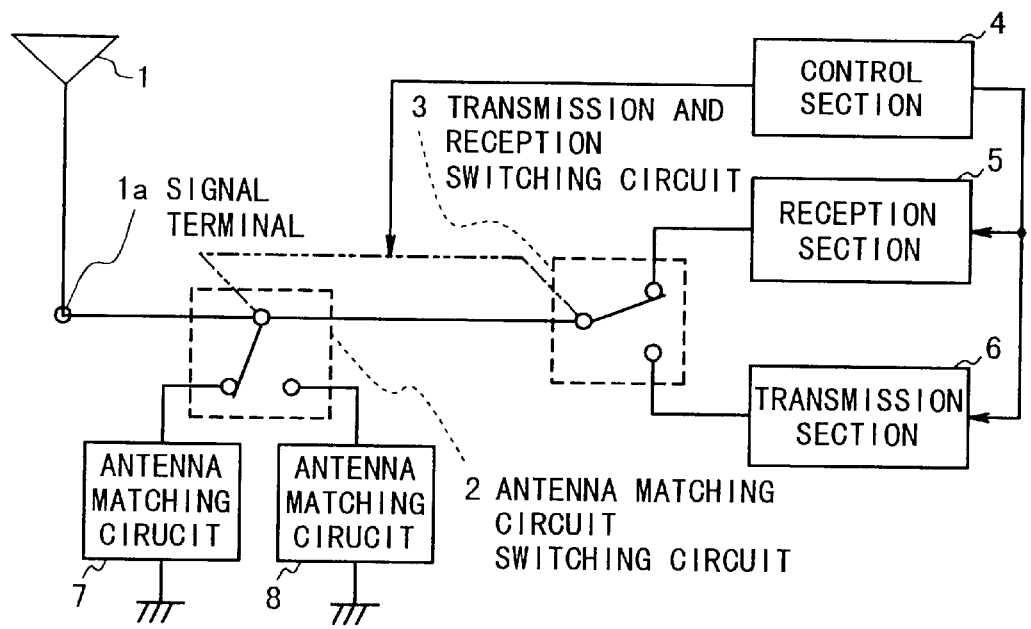
FIG. 1 is a block diagram of a portable telephone for the TDMA system which includes an antenna matching circuit switching system according to a first embodiment of the present invention.

FIG. 1 is a block diagram of the portable telephone for the TDMA system which contains the antenna matching circuit switching system according to an embodiment of the present invention. Referring to FIG. 1, the portable telephone is a portable telephone for the TDMA system for the mobile communication system, and is composed of an antenna 1, an antenna matching circuit switching circuit 2, antenna matching circuits 7 and 8, a transmission and reception switching circuit 3, a reception section 5, a transmission section 6, and a control section 4.

The portable telephone transmits a transmission signal supplied from the transmission section 6 as electromagnetic wave from the antenna 1 in a transmission period. The receiving section 5 receives a reception signal generated from the electromagnetic wave received by the antenna 1 in a reception period. The above transmission period and the above reception period are different signal periods from each other. The switching between the above transmission period and the above reception period is performed by the control of the receiving section 5, the control of the transmission section 6 and the control of the transmission and reception switching circuit 3 by a control section 4.

A signal terminal 1a is an interface point between the antenna 1 which uses a dipole antenna extendable in a stick-shape and a portable telephone main body section composed of the transmission and reception switching circuit 3, the receiving section 5, the transmission section 6 and the control section 4 which are formed on a printed circuit board. The signal terminal 1a is connected to a common terminal of the antenna matching circuit switching circuit 2 and a common terminal of the transmission and reception switching circuit 3. Two switching terminals of the antenna matching circuit switching circuit 2 are connected to the antenna matching circuit 7 and the antenna matching circuit 8, respectively. Two switching terminals of the transmission and reception switching circuit 3 are connected to the reception signal input terminal of the receiving section 5 and the transmission signal output terminal of the transmission section 6, respectively. Note that the signal terminal 1a and the transmission and reception switching circuit 3 is sometimes connected by a feeder line. The feeder line sometimes is a part of the impedance matching circuit of the antenna 1.

In an example of a digital mobile telephone system which uses a 900-MHz band, there is a difference of about 50 MHz between the frequency of the transmission signal (the transmission frequency) and the frequency of the reception signal (the reception frequency). When there is a frequency difference of this degree, there is a great difference in antenna matching between the transmission frequency and the reception frequency in the antenna 1 as a single element.

In the portable telephone for the TDMA system in the first embodiment, as described above, the common terminal of the antenna matching circuit switching circuit 2 is connected to the signal terminal 1a, i.e., the common terminal of the transmission and reception switching circuit 3, and the two switching terminals are connected to the antenna matching sections 7 and 8, respectively. The antenna matching section 7 is composed of a first coil 7-1 and a capacitor 7-2 and formed to have an approximately optimal impedance matching to the antenna 1 in the reception frequency when the antenna matching section 7 is connected to the signal terminal 1a, i.e., to the antenna 1. The antenna matching section 8 is composed of a second coil 8-1 and a second capacitor 8-2, and formed to have an approximately optimal impedance matching to the antenna 1 in the transmission frequency when the antenna matching section 8 is connected to the signal terminal 1a, i.e., to the antenna 1.

Now, in the reception period for the reception signal, the control section 4 connects the transmission and reception switching circuit 3 to the receiving section 5 and connects the matching switching circuit 2 to the antenna matching section 7. At that time, the impedance of the antenna 1 can be matched in the reception frequency such that there is almost no reflection of electromagnetic wave. As a result, the reception signal is supplied to the receiving section 5 with an approximately maximum gain of the antenna 1. Also, in the transmission period for the transmission signal, the control section 4 connects the transmission and reception switching circuit 3 to the transmitting section 6 and connects the matching switching circuit 2 to the antenna matching section 8. At that time, the impedance of the antenna 1 can be matched in a approximately optimal matching state in the transmission frequency. As a result, the antenna 1 irradiates the reception signal supplied from the transmitting section 6 with an approximately maximum gain in the form of electromagnetic wave.

Figure 2:
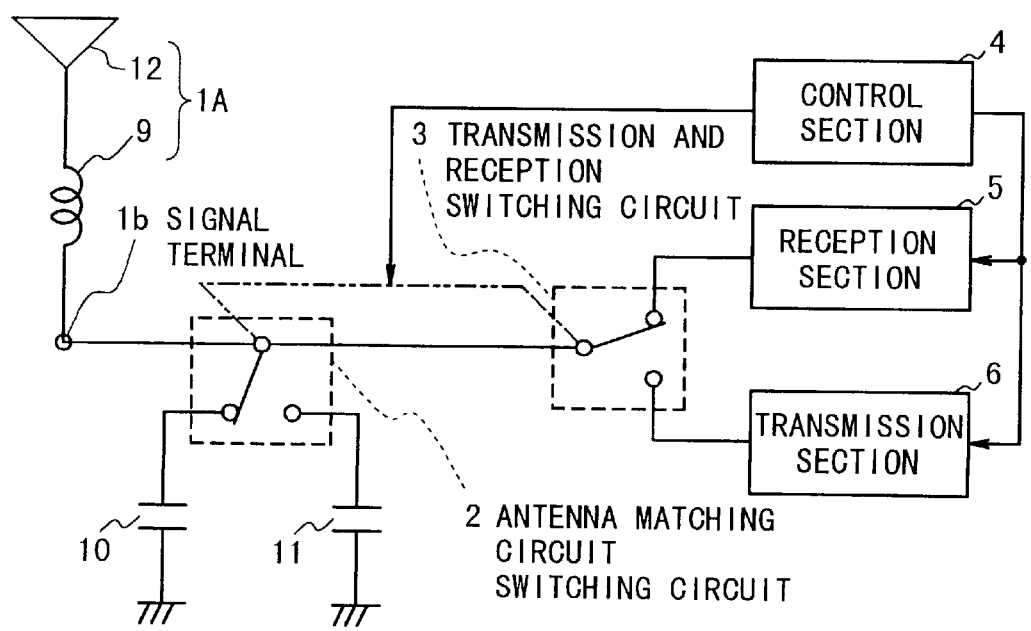
FIG. 2 is a block diagram of the portable telephone for the TDMA system which includes the antenna matching circuit switching system according to a second embodiment of the present invention.

FIG. 2 is a block diagram of the portable telephone for the TDMA system which includes the antenna matching circuit switching system according to the second embodiment of the present invention.

Referring to FIG. 2, the portable telephone for the TDMA system in the second embodiment has the antenna matching circuit switching circuits 2, and a transmission and reception switching circuit 3, the control section 4, the receiving section 5, the transmission section 6, as in the portable telephone of FIG. 1. However, this portable telephone includes an antenna 1A in place of the antenna 1, and the antenna matching circuits 7 and 8 which are respectively composed of capacitors 10 and 11. The antenna 1A includes an antenna element 12 with the length shorter than that of the antenna 1 when the antenna 1 is extended, and a coil 9. The coil 9 has a function to correct the functional length of the antenna element 12 such that it is about equivalent to the length of the antenna 1. Accordingly, there is the effect that the antenna 1A composed of the antenna element 12 and the coil 9 can be structured in a small size. The coil 9 may be formed in the form of a wire which is wound around a ferrite coil. A signal terminal 1b is an interface point between the antenna 1A and the portable telephone main body section, like the signal terminal 1a. The coil 9 may be arranged between the signal terminal 1b on the side of the portable telephone main body section and the common terminal of the antenna matching circuit switching circuit 2. In the antenna 1A having the above-mentioned structure, the capacitors are arranged between the signal terminal 1b and the common terminal of the transmission and reception switching circuit 3 to achieve the antenna matching. Therefore, the antenna matching circuits of the antenna 1A in this embodiment, one terminal of the capacitor 10 and one terminal of the capacitor 11 are connected to two switching terminals of the antenna matching circuit switching circuit 2, respectively. In addition, the other terminals of the capacitors 10 and 11 are grounded. The capacitor 10 is set to have the capacity to match to the antenna 1A in the reception frequency, and the capacitor 11 is set to have the capacity to match to the antenna 1A in the transmission frequency. Because the reception frequency and the transmission frequency in this portable telephone are different from each other, the capacity of the capacitor 10 and the capacity of the capacitor 11 are different from each other.

In the portable telephone for the TDMA system shown in FIG. 2, the simultaneous switching of the matching switching circuit 2 and the transmission and reception switching circuit 3 is performed by the control section 4, like the portable telephone for the TDMA system shown in FIG. 1. Therefore, the matching switching to the antenna 1A between the reception frequency and the transmission frequency and the transmission and reception switching between the receiving section 5 and the transmission section 6 can be performed at the same time.

Figure 3:
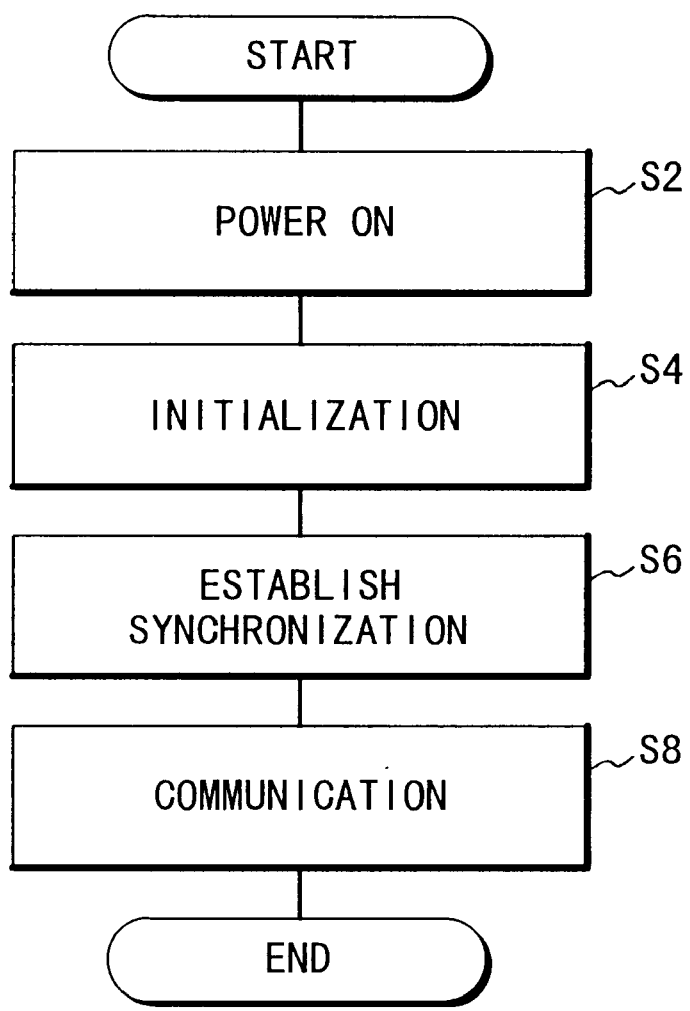
FIG. 3 is a flow chart illustrating of the operation of the antenna matching circuit switching system.

Next, the switching operation will be described with reference to FIG. 3.

In a step S2, the power of the portable telephone is turned on. At that time, in a step S4, an initializing operation is performed. That is, the control section 4 issues a reception control signal to the switching circuits 2 and 3. The antenna matching switching circuit 2 is switched in response to the reception control signal to connect the antenna matching circuit 7 to the antenna 1 or 1A. Also, the transmission and reception switching circuit 3 is switched in response to the reception control signal to connect the reception circuit 5 to the antenna 1 or 1A.

In TDMA communication system, one period is composed of the transmission period, the reception period, and an idle period, as well known. Also, a predetermined data pattern is always transmitted from a base station. Therefore, when the portable telephone is set in the reception mode in the steps S4, the predetermined data pattern is received via the antenna 1 or 1A to the reception circuit 5 using the antenna matching circuit 7. The predetermined data pattern is received during the reception period. In a step S6, the control section 4 establishes the synchronization with the base station using as a reference period the reception period during which the predetermined data pattern is received. That is, the control section 4 controls a built-in clock generator (not shown) to adjust the clock generation timing to the reception period. Thus, the transmission or reception can be correctly performed between the portable telephone and the base station in a step S8.

As described above, according to the present invention, an antenna matching circuit switching system of a portable telephone for a TDMA system includes the first antenna matching circuit for achieving the approximately optimal antenna matching to the antenna in the frequency of the reception signal, when the first antenna matching circuit is connected to the antenna. Also, the switching system includes the second antenna matching circuit for achieving the approximately optimal antenna matching to the antenna in the frequency of the transmission signal, when the second antenna matching circuit is connected to the antenna. The antenna matching circuit switching system connects either of the first antenna matching circuit and the second antenna matching circuit to the antenna, depending upon the transmission or reception period. Therefore, there is the effect that the antenna matching circuit can be simplified and formed in a small size for the mobile communication system in which the transmission frequency and the reception frequency of the electromagnetic wave which is transmitted and received by the antenna are different from each other.

What is claimed is:

1. An antenna matching circuit switching system of a portable telephone, comprising:

an antenna which transmits a transmission signal and receives a reception signal in form of electromagnetic wave;

a receiving section for receiving the reception signal from said antenna;

a transmission section for supplying said antenna with the transmission signal having a first frequency which is different from a second frequency of said reception signal;

a transmission and reception switching section for connecting said antenna to said receiving section in response to a reception control signal and to said transmission section in response to a transmission control signal;

a first antenna matching circuit which is matched to said antenna, connected between the antenna and ground to optimize efficiency of reception operation of the antenna at the second frequency;

a second antenna matching circuit, connected in parallel to the first antenna matching circuit, which is matched to said antenna, connected between the antenna and ground to optimize efficiency of transmission operation of the antenna at the first frequency;

an antenna matching circuit switching section for connecting said antenna to said first antenna matching circuit in response to the reception control signal and to said second antenna matching circuit in response to the transmission control signal; and a control section for selectively issuing the reception control signal and the transmission control signal to said transmission and reception switching section and said antenna matching circuit switching section.

2. An antenna matching circuit switching system according to claim 1, wherein said portable telephone is for a TDMA system, and wherein said control section issues the reception control signal during a reception period of one TDMA period and the transmission control signal during a transmission period thereof.

3. An antenna matching circuit switching system according to claim 1, wherein said control section issues the reception control signal when a power of said portable telephone is turned on.

4. An antenna matching circuit switching system according to claim 2, wherein said first antenna matching circuit is composed of a first coil and a first capacitor, and said second antenna matching circuit is composed of a second coil and a second capacitor.

5. An antenna matching circuit switching system according to claim 2, wherein said antenna is composed of an antenna element and a coil, and wherein said first antenna matching circuit is composed of a first capacitor, and said second antenna matching circuit is composed of a second capacitor.

6. A method of establishing antenna matching in a reception mode and a transmission mode in a portable telephone, comprising the steps of:

establishing a first matching quantity to an antenna to optimize efficiency of reception operation of the antenna, and connecting the first matching quantity between the antenna and ground in response to a reception control signal;

connecting said antenna to a receiving section in response to the reception control signal;

establishing a second matching quantity to said antenna to optimize efficiency of transmission operation of the antenna, and connecting the second matching quantity between the antenna and ground in response to a transmission control signal, wherein the first and second matching quantities are connected in parallel connecting said antenna to a transmission section in response to the transmission control signal;

selectively issuing the reception control signal and the transmission control signal.

7. A method according to claim 6, wherein said issuing step includes alternatively issuing the reception control signal and the transmission control signal.

8. A method according to claim 7, wherein said portable telephone is for a TDMA system, and wherein said issuing step includes issuing the reception control signal during a reception period of one TDMA period and the transmission control signal during a transmission period thereof.

9. A method according to claim 6, further comprising the step of issuing the reception control signal when a power of said portable telephone is turned on.

10. A method according to claim 6, wherein a first antenna matching circuit is composed of a first coil and a first capacitor, and a second antenna matching circuit is composed of a second coil and a second capacitor, and wherein said establishing steps includes connecting said antenna to said first antenna matching circuit in response to the reception control signal and to said second antenna matching circuit in response to the transmission control signal, respectively.

11. A method according to claim 6, wherein said antenna is composed of an antenna element and a coil, a first antenna matching circuit is composed of a first capacitor, and a second antenna matching circuit is composed of a second capacitor, and wherein said establishing steps includes connecting said coil to said first antenna matching circuit in response to the reception control signal and to said second antenna matching circuit in response to the transmission control signal, respectively.

* * * * *